United States Patent [19]

Wytaniec

[11] 4,407,159
[45] Oct. 4, 1983

[54] APPARATUS AND METHOD FOR DETECTING AN INTERFACE FROM A REMOTE LOCATION

[76] Inventor: Casimir S. Wytaniec, 3511 N. Lavergne, Chicago, Ill. 60641

[21] Appl. No.: 226,035

[22] Filed: Jan. 19, 1981

[51] Int. Cl.³ .................. G01F 23/22; G05D 9/00
[52] U.S. Cl. .................. 73/290 R; 73/298; 73/302; 137/393
[58] Field of Search ............ 73/302, 290 R; 137/391, 137/393, 386

[56] References Cited

U.S. PATENT DOCUMENTS

| | | | |
|---|---|---|---|
| 1,100,867 | 6/1914 | Dexter | 73/302 |
| 2,542,168 | 2/1951 | Voleau | 73/302 |
| 3,161,052 | 12/1964 | Harley | 73/302 |
| 3,262,313 | 7/1966 | Hanna | 73/302 |
| 3,581,754 | 6/1971 | Adams | 137/393 X |
| 3,780,581 | 12/1973 | Acre et al. | 73/302 |
| 3,900,022 | 8/1975 | Widran | 137/391 X |
| 4,006,636 | 2/1977 | Holmen | 73/302 |
| 4,211,249 | 7/1980 | Richards | 73/290 R |
| 4,258,745 | 3/1981 | Nicholson | 73/302 X |

*Primary Examiner*—Daniel M. Yasich
*Attorney, Agent, or Firm*—Gary, Juettner & Pyle

[57] ABSTRACT

Apparatus and method for detecting the presents of an interface between two fluids with a conventional interface detection apparatus, located remote from the interface, in a tube are disclosed. The apparatus and method utilize a driving fluid introduced into the tube to cause one or the other of the fluids forming the interface to flow from an end of the tube through the tube to the remote detection apparatus, permitting the latter to test the fluid in the tube to determine whether the interface is above or below the end of the tube.

29 Claims, 2 Drawing Figures

APPARATUS AND METHOD FOR DETECTING AN INTERFACE FROM A REMOTE LOCATION

This invention relates to an apparatus and method for detecting an interface between two fluids, and more particularly to a method and apparatus for detecting the interface between the two fluids or liquids remote from the interface.

PRIOR ART

Heretofore various devices and methods have been provided for measuring the interface between two fluids or liquids using various conventional instruments which sense the differences between the two fluids forming the interface. The prior art devices and methods have required that such instrument or at least its probe's sample taking or detector portion be located at the interface in order to detect the interface. If such instrument or probe were permanently mounted in place, it had the disadvantage that the readings obtained were, not infrequently, distorted by material accummulating on the probe, if the fluids about the probe were stagnent as would be the case in a settling tank or pond. Such a permanent installation required frequent removal for cleaning of the probe's sample taking or detector portion. Such removal and cleaning could be cumbersome when the interface was located a few feet or more from or below the upper surface of the light fluid. In a large settling tank or pond, it was not unusual for the probe to be many feet in length in order to position the sample taking portion of the probe at the interface. Prior art portable instrument installations for such interface detection had their own deficiencies. The long length of the probe or the structure carrying the same made moving and using it to take readings very cumbersome. While the problem of distortion or improper measurement due to accummulations or contamination was somewhat less troublesome in a portable set up, the probe still needed to be cleaned frequently. Also, with a portable set up there was a tendency to take fewer readings because of the work involved in moving the instrument and setting it up. Further, the probability of the portable type probe being damaged was greater, a factor to be considered with an instrument costing several thousand dollars or more.

BRIEF SUMMARY OF THE PRESENT INVENTION

The disadvantages of the prior art devices and methods for use with conventional instruments or probes for detecting interfaces have been eliminated by the present invention.

The apparatus of the present invention is adapted to be used with a conventional interface detection instrument and comprises a elongated pipe like member having its one end opened to and adapted to be located adjacent the interface of the two fluids or liquids forming the interface, and its other end extending away from the interface and adapted to accommodate the sample taking or detector portion of the conventional interface detection instrument, intermediate the pipe's ends, and a means for injecting a drive fluid, such as air, into the elongated pipe member at a point further distance from the interface than the location of the sample taking portion. Thus, in the method of the present invention, the drive fluid, such as air, may be introduced into the elongated pipe member to draw fluid from the one or lower end of the pipe up past the sample taking portion of the conventional instrument wherein it may be sampled or detected, the fluid then being driven out the opposite or upper end of the elongated pipe.

The present invention eliminates the need for constantly cleaning the probe's sample taking or detector portion of the instrument, as the moving fluid in the elongated pipe keeps the probe clean. Further, as the light fluid, or air, to drive the fluids being sampled is introduced into the elongated pipe above the sample taking or detector portion, the reading of the probe is not disrupted or interferred with by the presence of the drive fluid, such as in the form of bubbles of air. As the sample taking portion no longer need be located at the interface, it can be located remotely, and the instrument need not have a probe several feet or more long.

OBJECTS OF THE PRESENT INVENTION

It is one object of the interface detection apparatus and method of the present invention to provide a reliable apparatus and method for detecting the interface between two fluids with a sample taking or detector portion located remotely from the interface.

It is another object of the interface detection apparatus and method of the present invention to provide a continuous flow of fluids being sampled past a remotely located sample taking probe for keeping the probe free of distortion or error due to accummulations or contamination.

Yet another object of the interface detection apparatus and method of the present invention is the inducement of a cleaning flow by the introduction of a drive fluid, such as air, to cause the two fluids forming the interface and being sampled to flow past a sample taking or detector probe remotely located from the interface.

These and other objects and advantages of the interface detection apparatus and method of the present invention will become apparent from the following written description and the accompanying figures of the drawings wherein:

DESCRIPTION OF THE PREFERRED EMBODIMENT

Figure 1:
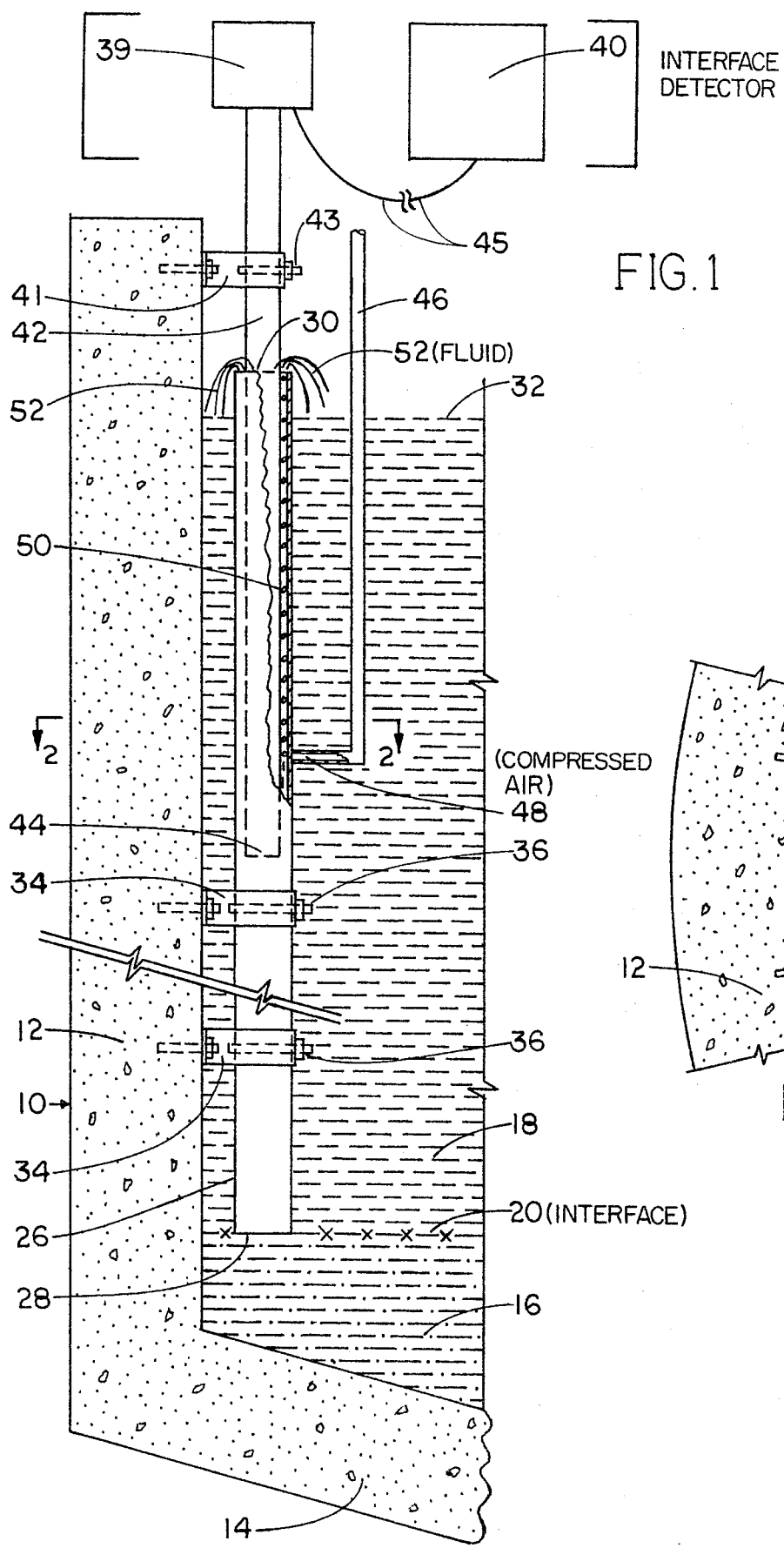
FIG. 1 is a cross-sectional view of a portion of a tank containing the interface detection apparatus of the present invention, with a portion thereof being broken away to better illustrate the invention.
Figure 2:
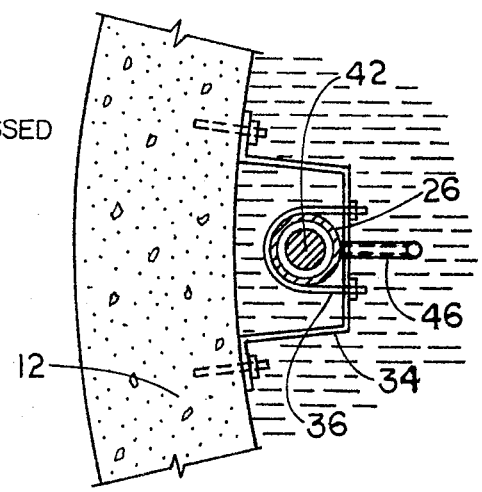
FIG. 2 is a cross-sectional view taken along lines 2—2 of FIG. 1.

Referring to FIGS. 1 and 2, a portion of a tank 10, such as a sedimentation or settlement tank or pond for a sewage treatment plant is shown and has a side wall 12 and a bottom 14 formed, in this instance, of concrete. The tank 10 is filled with a heavier fluid 16 (represented in the drawings by the —·—·—line) and a lighter fluid 18 (represented by the — — lines). In the case of a sedimentation tank the heavier fluid 16 may be effluent containing water and lighter fluid 18 clear water. Between the fluids 16 and 18 an interface 20 (represented by the —X—X— line) is formed. Of course, the interface need not be a clearly defined plane, but could be a zone of an inch or more in height, or fluids forming the interface could be a variation in concentration of an element. Tank 10 may be provided with inlet means, not shown, for adding fluid 16 to the tank. Normally in the operation of a tank 10, after tank effluent settles and drops out to the bottom of tank 10 (such not being shown), it is transformed into clear fluid 18 which may be removed from tank 10 by outlet means, not shown. For purposes of this discussion, and not by way of limitation, it will be assumed that in tank 10 it is desired to add fluid 16 and withdraw fluid 18 in a manner such that the interface 20 remains substantially stationary, or moves only a minimum amount. The apparatus and method of the present invention will be described in the environment of the above described tank 10, fluids 16 and 18 and interface 20.

The apparatus of the present invention comprises an elongated pipe like member or tube 26 having a first opening or its lower end 28 situated at about the interface 20 and a second opening or its upper end 30 extending above the upper surface 32 of liquid 18. In a conventional sedimentation or settling tank or pond the interface 20 may be located 12 feet or more below the surface 32 so that the pipe or tube 26 may be 12 feet or more in length. The tube 26 may, if desired, be secured in place to the tank by means such as a plurality of conventioanl brackets 34 and "U" clamps 36.

In this instance, schematically shown, mounted above the pipe or tube 26 at its upper end, is a sampling mechanism 39 of a remotely located, conventional interface detecting instrument 40 (such as a Monitek Model 53 suspended solids meter operating on a photocell principal or a similar Rexnord device, or a Monitek Model 55A or 156 sludge blanket detector). The mechanism 39 has a probe 42 extending therefrom. The instrument 40 has a sample taking or detecting portion 44 on probe 42, which samples the fluid from its adjacent environment or takes readings from the same which are analized by the remainder of the instrument 40, as is conventional. The sample taking or detecting portion 44 is connected to the instrument 40 by a cable 45. Of course the instrument 40 could be located adjacent mechanism 39, the important feature being that probe 42 and the sample taking or detection portion 44 be located within the tube 26 so that the fluid in the tube is sampled. The probe 42 is, by way of example in this instance, mounted to the wall 12 by means of a bracket 41 and "U" clamp 43. At the lower end of probe 42, the conventional sample taking or detection portion 44 is mounted within tube 26, mediate its ends, preferably only a short distance, say 24–26 inches below the surface 32 of fluid 18.

To cause fluid to move through the pipe or tube 26, it is intersected between the surface 32 and sample taking portion 44 by a supply line 46 for injecting a drive fluid 48 into tube 26. Generally, the intersection of line 46 with tube 26 should be about 20 inches below the surface 32 to provide sufficient drive forces to cause the flow in pipe 26. In many instances, compressed air may be used as the drive fluid. The intersection of line 46 with tube 26 is located sufficiently above the sample taking or detection portion 44 so that none of the air bubbles emanating from line 46 into the space between the tube 26 and probe 42, will interfere with the detecting or sample taking at the portion 44. Generally, a spacing of 4 to 6 vertical inches between the point of intersection with tube 46 and portion 44 should prove sufficient to drive the fluid in tube 26, but yet prevent any interference.

As is shown in FIG. 1, the introduction of the drive fluid or air from line 46 into the interior of tube or pipe 26 causes the air bubbles 50 to rise in the tube 26. The bubbles in turn induce a driving force in the fluid in the pipe 26 to draw fluid in from the lower end opening 28 of pipe 26 and expel the same out the upper end opening 30, the fluid then overflowing the upper end of pipe, as indicated at 52. More specifically, the fluids flow past the sampling portion 44 and upwardly out the top of the tube 26 because the hydrostatic head at the upper surface 32 is greater than that at the upper end 30, due to the introduction of the drive fluid, the compressed air and air bubbles, and the difference in the density or specific gravity thus created between the aerated and non-aerated fluids.

Of course the drive fluid selected should be compatible with the other fluids. In instances where the sample-taking portion 44 is located above the interface 20, the drive fluid should be lighter in density than either the fluids 16 and 18.

Thus in the method of the present invention, there is induced in the tube or pipe 26 a flow of fluid, which may be continuous, by the flow of air bubbles from line 46 to the top of pipe 26. Thus, the sampling-taking portion 44 of the probe 42 for the conventional interface detector 40 is provided with a continuous flow thereby from the lower end 28 of the pipe 26. Thus, depending upon whether fluid 16 or 18 is flowing into the pipe 26 and detected at the sample-taking portion 44, the instrument 40 can regulate the operation of the inlet or outlet flows of fluids 16 or 18 to or from tank 10, in a conventional manner, to maintain the interface 20 at the desired position, at or near the lower end 28 of pipe 26.

The continuous flow of fluid, even of the fluid 16, from the lower end 28 past the sample-taking portion 44 of the probe 42, and especially the flow of fluid 18, keeps the pipe 46 and probe 42 free and clear of accumulations and contaminates, which in the past effected readings. Further, as the installation can be made more or less permanent, it is more likely that frequent readings will be taken or the interface monitored continuously as reading or monitoring is more easily made or done and the likelihood of damage to the instrument 40 or its probe 42 is greatly reduced as it need not be moved, if installed permanently, or even if portable, for cleaning. Further, as the drive for the fluid in the pipe is provided by readily available compressed air, no costly pumps or piping need be used.

While the preferred apparatus and method have been illustrated and described, it will be appreciated that variations and modifications of the method steps and apparatus can be made. For example, the installation need not be permanently affixed to the wall of the tank. Other various forms of conventional interface detecting instrumentation could be adapted. The opening for the incoming fluid could be located at other than the lower end of the pipe. A drive fluid other than compressed air could be used. The sample-taking portion of the interface detection instrument could be located below the interface, in which case the drive fluid would be heavier than the fluids forming the interface with the drive fluid dropping downwardly and the upper opening of the pipe at the interface. The probe may be made smaller and need not extend down the center of the tube, but may merely be located remote from the interface. Such variations and modifications in the apparatus and method will still fall within the scope of the appended claims.

What is claimed is:

1. A method for using a conventional interface detecting instrument having a detector portion with a tube having upper and lower openings to detect an interface between two fluids remote from the interface, comprising the steps of:
(a) locating the tube in the fluids,
(b) positioning one of the openings in the tube substantially at the interface,
(c) locating the detector portion in the tube between the upper and lower ends and remote from the interface, and
(d) introducing a drive fluid into the tube to cause at least one of the fluids to be drawn in from the opening substantially at the interface and flow from the interface, past the detector portion and out of the other opening of the tube, whereby the detector portion may make a reading of the fluid flowing past it, and the flow of fluid caused by the introduction of the drive fluid keeps the detector portion free of contaminants.

2. The method of claim 1 comprising the steps of:
(a) locating the lower end of the tube substantially at the interface,
(b) locating the detector portion in the tube above the lower end and the interface, and
(c) introducing the drive fluid into the tube above the detector portion.

3. The method of claim 1 comprising the steps of:
(a) locating the upper end of the tube substantially at the interface,
(b) locating the detector portion in the tube below the upper end and the interface, and
(c) introducing the drive fluid into the tube below the detector portion.

4. The method of claim 1 or 2, comprising the steps of:
introducing compressed air as the drive fluid.

5. A method for using a conventional interface detecting instrument having a detector portion with a pipe like member with two ends to detect an interface between two fluids remote from the interface, comprising the steps of:
(a) locating the pipe like member in the fluids with one of its ends substantially at the interface,
(b) locating the detector portion within the pipe like member between the other end and the interface, and
(c) introducing a compressed gas into the pipe like member between the other end and the detector portion to cause at least one of the fluids forming the interface to flow from the one end, past the detector portion, and out the other end, whereby the detector portion may test the fluid flowing past it, and the flow of fluid caused by the introduction of the compressed gas keeps the detector portion free of contaminants.

6. The method of claim 1 or 2, comprising the steps of locating a sample taking type detector remote from said interface.

7. The method of claim 1 or 2, comprising the step of locating a probe of a suspended solids meter remote from the interface.

8. The method of claim 1 or 2, comprising the step of locating a probe or a sludge blanket detector remote from the interface.

9. Apparatus for using a conventional interface detecting instrument having a detector portion located remote from an interface between two fluids to detect the interface, comprising a pipe like member adapted to extend away from the interface, said pipe like member having two spaced apart openings one higher than the other, one of said openings being adapted to be located substantially at the interface and the other opening being adapted to be located away from the interface, said pipe like member receiving on its interior the detector portion at a position between said two openings, and means for introducing a drive fluid into said pipe like member for causing the fluid at said one opening of said pipe like member to flow past the detector portion, said means for introducing a drive fluid being in communcation with the interior of said pipe like member between the detector portion and said other oepning in said pipe like member which is spaced away from the interface, whereby fluid flow may be caused in said pipe like member past the detector portion by the introduction of the drive fluid, said fluid flowing in said pipe like member may be detected, and said detector portion and interior of said pipe like member may be kept clean by the flowing fluid.

10. The apparatus as in claim 9, wherein said means for introducing drive fluid comprises a gas line under pressure.

11. The apparatus as in claim 10, wherein said gas line under pressure is a compressed air line.

12. The apparatus of claim 9, wherein said openings in said pipe like member are provided by the ends thereof.

13. The apparatus as in claim 12, wherein said pipe like member has one end above the other.

14. The apparatus as in claim 13, wherein said end located substantially at the interface is below said detector portion.

15. The apparatus as in claim 14, wherein said means for introducing a drive fluid introduces a fluid lighter than the two fluids forming the interface.

16. The apparatus as in claim 15, wherein the drive fluid is compressed air.

17. The apparatus as in claim 13, wherein said end located substantially at the interface is above said detector portion.

18. The apparatus as in claim 17, wherein the means for introducing a drive fluid introduces a fluid heavier than the two fluids forming the interface.

19. The apparatus as in claim 9, wherein said detector portion is a sample taking detector and is adapted to take samples from fluids within said pipe.

20. The apparatus as in claim 9, wherein said detector portion is part of a suspended solids meter and is adapted to take readings from fluids within said pipe.

21. The apparatus as in claim 9, wherein said detector portion is part of a sludge blanket detector and is adapted to take readings from fluids within said pipe.

22. Apparatus for using a conventional interface detecting instrument having a detector portion located remote from a horizontal interface between two fluids to detect the interface, comprising a tube like member to be located in the fluids and extending from the interface, said tube like member being arranged generally vertically and having spaced apart ends, the lower end being located substantially at the interface and the upper end being located adjacent the surface of the upper of said two fluids, said tube like member receiving on its interior the detector portion at a position between said two ends, the detector portion being located generally a foot or more from said upper end, and means for introducing a pressurized gas into said tube like member for causing fluid flow passed the detector portion, said means for introducing a pressurized gas being in communication with the interior of said tube like member between the detector portion and said upper end of said tube, whereby fluid flow may be caused in said tube like member from said lower end, past the detector portion, and out said upper end by the introduction of the pressurized gas, and the fluid flowing in said tube like member may be detected, while the flow keeps the detector portion clean.

23. The apparatus as in claim 22, wherein the pressurized gas is compressed air.

24. Apparatus as in claim 22, wherein said tube like member is circular in cross-section and has a length extending from the interface to an inch or more above the upper surface of said upper fluid forming the interface.

25. The apparatus as in claim 22, wherein said detector portion takes samples of fluids.

26. The apparatus as in claim 22, wherein said detector portion is part of a suspended solids meter.

27. The apparatus as in claim 22, wherein said detector portion is part of a sludge blanket detector.

28. The apparatus as in claim 22, wherein the means for introducing a pressurized gas communicates with the tube like member at least 4 inches above the location of the detector portion in the tube like member, whereby interference with the detector portion is prevented.

29. A method for using a conventional interface detecting instrument having a detector portion with a pipe like member with upper and lower ends, to detect an interface between two fluids remote from the interface comprising the steps of:
  (a) locating the pipe like member in the fluids with the lower end substantially at the interface,
  (b) locating the detector portion within the pipe like member between the other end and the interface, and
  (c) introducing a compressed gas into the pipe like member above the detector portion to cause at least one of the fluids forming the interface to flow from the lower end past the detector portion and out the upper end, whereby the detector portion may test the fluid flowing past it, and the flow of fluid in the pipe like member caused by the introduction of the compressed gas keeps the detector portion free of contaminants.

* * * * *